3,216,981
CYANOALKYLTHIAZOLESULFENAMIDES
Marion W. Harman, Nitro, W. Va., assignor to Monsanto
Company, a corporation of Delaware
No Drawing. Filed Oct. 22, 1956, Ser. No. 617,284
4 Claims. (Cl. 260—79.5)

The present invention relates to a new class of chemical compounds and to the use of said new compounds as accelerators of the vulcanization of rubber. Mercaptobenzothiazole always has been known as an accelerator possessing a tendency to scorch or to cause some prevulcanization of rubber mixes and this tendency has been aggravated since the development of the newer carbon blacks which lack the inherent cure retardation of channel blacks. Although many mechanical and handling changes have partially solved this problem, more progress to the solution of the difficulty has resulted from the development of special retarders and most particularly from the development of new types of vulcanization accelerators, especially of the class known as sulfenamides. The new class of accelerators comprising the present invention consist of a sub-class of sulfenamide compounds.

The new compounds which are set forth in detail in the following description of the invention may be illustrated by the general formula

wherein R represents a mercaptothiazole group, $R_1$ represents an alkyl or a cyanoalkyl group, and $R_2$ represents a cyanoalkyl group. Preferably, the alkyl group mentioned contains not more than four carbon atoms. A method of preparing the new class of compounds is illustrated by the following examples.

EXAMPLE 1.—PRODUCT A

*N,N-bis(2-cyanoethyl)-2-benzothiazolesulfenamide*

A portion, 38.8 parts (0.316 mole) of 3,3'-iminodipropionitrile, $HN(C_2H_4CN)_2$, was introduced into a suitable vessel equipped with an agitator, a dropping funnel and a condenser. The nitrile was then cooled by suitably applied means to approximately 0° C. and 18.6 parts (0.25 mole) of sodium hypochlorite in the form of a water solution were slowly added thereto through the dropping funnel. During the addition of the hypochlorite, the temperature of the agitated mass was held between 0° C. and —5° C. A purple crystalline solid was formed while the liquid phase was white and foamy. Agitation was continued and the temperature was allowed to increase to about 5° C. and then 47.2 parts (0.25 mole) of sodium mercaptobenzothiazole (114 parts of a 36.5% solution) were slowly added. The temperature of the agitated mass rose to 12° C. while a heavy brown oily liquid product was formed. The agitation was continued for about an hour and the reaction mixture then extracted with ether. However, a quantity of solid material separated which was removed by filtration. Since crystallization from the filtrate continued, the entire filtrate was allowed to stand for 48 hours and then filtered. The solid crystalline material so obtained proved to be the desired product in high purity. The crystals, after drying at about 50° C., were found to melt at 102–104° C. Analysis confirmed the product obtained was that named above, $C_{13}H_{12}N_4S_2$, as is evident from these data:

|  | Percent Found | Percent Theory |
| --- | --- | --- |
| Sulfur | 21.92 | 22.22 |
| Nitrogen | 19.67 | 19.45 |

EXAMPLE 2.—PRODUCT B

*N-methyl N-(2-cyanoethyl)-2-benzothiazolesulfenamide*

As a second example of the invention, 138 parts of a 30.2% solution of the sodium salt of 2-mercaptobenzothiazole (0.25 mole) was vigorously agitated and 84 parts (1 mole) of 3-methylaminopropionitrile, $CH_3NHC_2H_4CN$, added thereto. The addition was made at room temperature with no cooling means employed. Thereupon, 51.9 parts (0.125 mole) of 24.8% sulfuric acid were added and to the turbid solution produced, 22.4 parts (0.30 mole) of sodium hypochlorite in the form of a 14.48% solution were slowly added while stirring and holding the temperature between 25–35° C. A resinous solid formed gradually. After continued stirring 2 parts of sodium sulfite were added to destroy unreacted hydrochlorite and the mass cooled to 25° C. Water was then decanted off and the residue was dissolved in ethyl ether and filtered from insoluble by-products. The ethereal solution was water washed until the washings were neutral to litmus and the ether was removed in vacuo. A dark amber oily product was obtained.

EXAMPLE 3.—PRODUCT C

*N-tert. butyl N-(2-cyanoethyl-2-benzothiazolesulfenamide*

Another example of the invention is the above-named product which was obtained by dissolving 43 parts (0.25 mole) of 2-mercaptobenzothiazole (97% purity) in 50 parts of water containing 40 parts of 25% sodium hydroxide solution (0.25 mole). Thereupon at temperatures between 22–35° C., 126 parts (1 mole) of 3-tert-butylaminopropionitrile were added and the mixture stirred for a few minutes. Then 49.6 parts (0.125 mole) of 25% sulfuric acid were added and to the turbid solution formed, 22.4 parts (0.30 mole) of sodium hypochlorite in the form of a 14.35% solution were slowly added, with rapid agitation over a period of time, while holding the temperature of the entire mixture at 32–34° C. Fine crystals were obtained at first, followed by the formation of a heavy oil and ultimately, after stirring continually, a solid product. Then 3 parts of sodium sulfite were added to destroy any residual oxidizing agent and the product was then collected by filtration and the solid washed with water to neutrality and air dried. The white to faintly tan colored crystals melted, after recrystallization from ethyl ether, at 92° C. The product named as Product C and having the empirical formula $C_{14}H_{17}N_3S_2$ was identified by analysis as shown below:

|  | Percent Theory | Percent Found |
| --- | --- | --- |
| Nitrogen | 14.43 | 14.23 |
| Sulfur | 22.0 | 22.1 |

EXAMPLE 4.—PRODUCT D

*N-isopropyl N-2-cyanoethyl (mixed ethyl and dimethyl) 2-thiazolesulfenamide*

Into a suitable reactor was charged 24.6 parts by weight (0.22 mole) of 3-isopropylaminopropionitrile. The amine was cooled to 0 to —4° C. and thereto was added 0.2 mole of sodium hypochlorite as a 19.9% solution. The addition required about 40 minutes. Then, while stirring of the reaction mixture was continued there was added a solution made up from 29.2 parts (0.2 mole) of a mixture of ethyl and dimethyl 2-mercaptothiazole and 32 parts (0.2 mole) of 25% sodium hydroxide and 12 parts of water. The reaction mixture was kept at 0 to —5° C. during the addition of this solution which required about 30 minutes. Stirring was continued for another 30 minutes and the reaction mixture extracted with ether. The ether solution was washed with water to neutrality, dried and the ether removed in vacuo to yield the desired product as a residue. It was a heavy oil. Analysis gave 26.0% sulfur as compared to 25.6% calculated.

EXAMPLE 5.—PRODUCT E

*N-cyclohexyl N-(2-cyanoethyl)-2-benzothiazolesulfenamide*

A charge consisting of 28.5 parts (0.1875 mole) of 3-cyclohexylaminopropionitrile, 29.9 parts (0.09 mole) of 2,2'-dithiobisbenzothiazole and about 90 parts of benzene were heated at refluxing temperature for 24 hours. The reaction mixture was then cooled and filtered from a small quantity of unreacted material. The filtrate was extracted with 4% aqueous sodium hydroxide and then washed with water. The solvent was removed and the dilute liquid residue extracted twice with petroleum ether to remove any unreacted amine. The product was redissolved in ethyl ether and filtered to remove a trace of insoluble material and the ether removed in vacuo. The product was a brown syrup.

EXAMPLE 6.—PRODUCT F

*N-n-butyl N-(2-cyanoethyl)-2-benzothiazolesulfenamide*

A charge consisting of 37.8 parts (0.3 mole) of 3-n-butylaminopropionitrile, 49.8 parts (0.15 mole) of 2,2'-dithiobisbenzothiazole and about 140 parts of benzene were heated at refluxing temperature for 7 hours. After cooling the reaction mixture was filtered from any unreacted material and the filtrate washed with 4% sodium hydroxide, then water, and the solvent removed. The liquid residue remaining after evaporation of the solvent was extracted twice with heptane, then dissolved in ether, filtered and the ether removed in vacuo. The product was a brown syrup.

As illustrative of the accelerating properties rubber stocks were prepared in the well known manner from the following recipes, wherein the quantities represent parts by weight:

| Stock | A | B | C | D | E |
| --- | --- | --- | --- | --- | --- |
| Smoked sheets rubber | 100 | 100 | 100 | 100 | 100 |
| Carbon black (Philblack O) | | | | | 50 |
| Zinc oxide | 5 | 5 | 5 | 5 | 5 |
| Stearic acid | 1 | 1 | 0.5 | 0.5 | 3 |
| Saturated hydrocarbon softener | | | | | 3 |
| Sulfur | 3 | 3 | 3 | 3 | 2.5 |
| Antioxidant | | | | | 1.5 |
| Product A | 1 | | | | |
| Product D | | 0.8 | | | |
| Product E | | | 0.75 | | |
| Product F | | | | 0.75 | |
| Product C | | | | | 0.5 |

The above Stocks A, B, C and D were cured by heating in a press at a temperature of 135° C. (275° F.) while Stock E was cured at a temperature of 144° C. The physical properties of the resulting vulcanizates are set forth in the following table:

TABLE I

| | Time of cure, mins. | Stock | | | | |
| --- | --- | --- | --- | --- | --- | --- |
| | | A | B | C | D | E |
| Modulus of elasticity at 300% elongation. | 20 | | | | | 1,440 |
| | 30 | 135 | 180 | 100 | 90 | 2,140 |
| | 45 | 210 | 203 | 115 | 110 | 2,060 |
| | 60 | 210 | 230 | 135 | 125 | 2,130 |
| | 75 | 255 | | 160 | 145 | |
| Tensile strength at break. | 20 | | | | | 3,150 |
| | 30 | 1,865 | 2,583 | 1,815 | 1,820 | 3,670 |
| | 45 | 2,615 | 3,010 | 2,310 | 2,085 | 3,830 |
| | 60 | 3,170 | 3,540 | 2,760 | 2,120 | 3,490 |
| | 75 | 3,700 | | 2,575 | 2,510 | |
| Mooney scorch at 135° C | | | 34 | 4 | | 13.5 |

The scorch was determined on Stocks C and D using a Williams plastometer and preheating the pellets at 200° F. The scorch times were 6 and 7 hours respectively. As shown above, the cyano substituted arylene thiazole sulfenamides are delayed action accelerators, the non-arylene thiazole derivatives being of another type. Although the cyano arylene thiazole sulfenamides provide desirable processing safety, they nevertheless are efficient accelerators above their critical temperature.

It is to be understood that the invention is not limited to the specific examples shown inasmuch as the synthetic sulfur vulcanizable rubbers can be employed equally as well as the natural rubber shown. Moreover, other proportions of accelerator may, if required, be taken than the amounts used in the illustration shown. Likewise, in obtaining the cyano alkyl derivatives, in place of sodium mercaptobenzothiazole, derivatives thereof such as methyl, ethoxy, chlor, nitro, phenyl and the like substituents of 2-mercaptobenzothiazole are within the scope of the invention.

It is intended to cover all changes and modifications of the examples of the invention herein chosen for purposes of disclosure which do not constitute departures from the spirit and scope of the invention.

What is claimed is:

1. As a new compound N,N-bis(2-cyanoethyl)-2-benzothiazolesulfenamide.

2. The process of vulcanizing rubber which comprises heating rubber and sulfur in the presence of N,N-bis(2-cyanoethyl)-2-benzothiazolesulfenamide.

3. A vulcanized rubber product obtained by heating rubber and sulful in the presence of N,N-bis(2-cyanoethyl)-2-benzothiazolesulfenamide.

4. The method of vulcanizing rubber which comprises heating rubber and sulfur in the presence of dibeta-cyanoethyl-2-benzothiazolesulfenamide.

References Cited by the Examiner

UNITED STATES PATENTS

| | | | |
| --- | --- | --- | --- |
| 2,271,782 | 2/42 | Sloan | 260—785 |
| 2,387,834 | 10/45 | Davis | 260—785 |
| 2,582,857 | 1/52 | Brooks | 260—306.6 |
| 2,595,334 | 5/52 | Clapp et al. | 260—306.6 |
| 2,809,202 | 10/57 | Schoene et al. | 260—306.6 |

JOSEPH L. SCHOFER, *Primary Examiner.*

A. M. BOETTCHER, HERBERT J. LIDOFF, *Examiners.*